(12) United States Patent
Boeckh et al.

(10) Patent No.: US 8,507,613 B2
(45) Date of Patent: Aug. 13, 2013

(54) PROCESS FOR THE ALKOXYLATION OF AMINO GROUP CONTAINING POLYMERS

(75) Inventors: Dieter Boeckh, Limburgerhof (DE); Stefan Frenzel, Mannheim (DE); Christian Bittner, Bensheim (DE); Andrea Misske, Speyer (DE); Ulrich Annen, Hassloch (DE); Wilfried Sager, Mutterstadt (DE); Sophia Ebert, Mannheim (DE); Andreas Eichhorn, Ellerstadt (DE)

(73) Assignee: BASF SE, Ludwigshafen (DE)

( * ) Notice: Subject to any disclaimer, the term of this patent is extended or adjusted under 35 U.S.C. 154(b) by 534 days.

(21) Appl. No.: 12/743,754

(22) PCT Filed: Nov. 17, 2008

(86) PCT No.: PCT/EP2008/065671
§ 371 (c)(1),
(2), (4) Date: May 19, 2010

(87) PCT Pub. No.: WO2009/065805
PCT Pub. Date: May 28, 2009

(65) Prior Publication Data
US 2010/0286342 A1 Nov. 11, 2010

(30) Foreign Application Priority Data
Nov. 23, 2007 (EP) ..................................... 07121398

(51) Int. Cl.
*C08G 65/00* (2006.01)
*C08G 65/30* (2006.01)

(52) U.S. Cl.
USPC ........ 525/384; 525/329.4; 525/385; 525/509; 525/540

(58) Field of Classification Search
USPC ...................... 525/385, 384, 329.4, 509, 540
See application file for complete search history.

(56) References Cited

U.S. PATENT DOCUMENTS 5,565,145 A 10/1996 Watson et al.
2008/0153983 A1 6/2008 Boeckh et al.

FOREIGN PATENT DOCUMENTS

| WO | 95 32272 | 11/1995 |
|---|---|---|
| WO | 97 23546 | 7/1997 |
| WO | WO 9723546 A1 * | 7/1997 |
| WO | 99 16811 | 4/1999 |
| WO | 2006 108857 | 10/2006 |

OTHER PUBLICATIONS

H. L Sanders, et al., "Ethoxylation of Fatty Amines", Journal of the American Oil Chemists Society, 46, 1969, pp. 167-170.

* cited by examiner

Primary Examiner — Kelechi Egwim
(74) Attorney, Agent, or Firm — Oblon, Spivak, McClelland, Maier & Neustadt, L.L.P.

(57) ABSTRACT

The present invention relates to a process for the alkoxylation of a first polymer comprising at least one monomer unit having NH groups and optionally $NH_2$ groups, wherein the first polymer has a molecular weight $M_w$ of at least 500 g/mol, comprising the steps of (a) reacting the first polymer with alkylene oxide in a reaction mixture comprising a solvent until the average degree of alkoxylation of each NH group and each optional $NH_2$ group, calculated as two NH groups, is from 0.75 to 1.25; (b) adding a second polymer of formula (I), wherein R is a linear or branched alkyl group having from 1 to 20 carbon atoms, each R' is independently a linear or branched alkyl group having from 1 to 20 carbon atoms or hydrogen, each n is independently from 1 to 5 and m is from 5 to 40, to the reaction mixture of step (a); (c) at least partially removing the solvent from the reaction mixture of step (b); and (d) further reacting the reaction mixture of step (c) with alkylene oxide at a given temperature until the average degree of alkoxylation of each NH group and each optional $NH_2$ group, calculated as two NH groups, of the first polymer is from 2 to 40. The present invention also relates to a polymer composition obtainable from that process and the use of such a polymer composition.

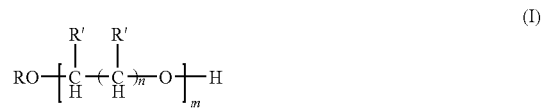

(I)

19 Claims, No Drawings

PROCESS FOR THE ALKOXYLATION OF AMINO GROUP CONTAINING POLYMERS

The present invention relates to a process for the alkoxylation of a polymer comprising at least one monomer unit having NH groups and optionally $NH_2$ groups and polymer compositions obtainable from that process.

Alkoxylated amine containing compounds are well known and used e.g. as ingredients of cleaning compositions.

The preparation of alkoxylated amine containing compounds is described e.g. by H. L. Sanders et. al., Journal of the American Oil Chemists Society 46 (1969), 167-170. Here, the ethoxylation of fatty amines is described.

The mechanism of ethoxylating amines results in quaternary nitrogen compounds which act as catalysts but are also subject to Hofmann-elimination resulting in by products which cause coloured and malodorous products.

Another problem associated with the alkoxylation of amines results from the fact that in the first addition step the hydroxyalkyl group is reacted with the amino group and in subsequent addition steps (degree of alkoxylation is >1) only hydroxy groups are involved causing higher viscosity values with an increasing alkoxylation degree. Therefore, the alkoxylation of amines is often carried out as multistep step reaction.

In case of ethoxylated amino functionalised polymers it is described in WO-A 99/16811 that the use of bleaching agents like $NaBH_4$ can enhance colour properties.

As mentioned above, another problem associated with the alkoxylation of amine containing polymers is the fact that the resulting products may have increased viscosity resulting in difficulties during the manufacture.

In WO-A 97/23546 this problem is solved by using conventional solvents. This results in the draw back that after having obtained the desired alkoxylated product a solvent has to be removed. Consequently, the space-time-yield for such processes is low.

Thus, there is a need to provide processes eliminating these draw backs at least in part.

Accordingly, an object of the present invention is the provision of such processes.

This problem is solved by a process for the alkoxylation of a first polymer comprising at least one monomer unit having NH groups and optionally $NH_2$ groups, wherein the first polymer has a molecular weight $M_w$ of at least 500 g/mol, comprising the steps of (a) reacting the first polymer with alkylene oxide in a reaction mixture comprising a solvent until the average degree of alkoxylation of each NH group and each optional $NH_2$ group, calculated as two NH groups, is from 0.75 to 1.25;

(b) adding a second polymer of formula (I)

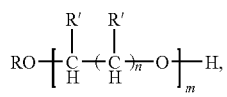

wherein R is a linear or branched alkyl group having from 1 to 20 carbon atoms, each R' is independently a linear or branched alkyl group having from 1 to 20 carbon atoms or hydrogen, each n is independently from 1 to 5 and m is from 5 to 40, to the reaction mixture of step (a);

(c) at least partially removing the solvent from the reaction mixture of step (b); and (d) further reacting the reaction mixture of step (c) with alkylene oxide at a given temperature until the average degree of alkoxylation of each NH group and each optional $NH_2$ group, calculated as two NH groups, of the first polymer is from 2 to 40.

It was found that the use of a second polymer according to formula (I) can be used to lower the viscosity of the alkoxylated first polymer by forming a polymer composition so that in the second step of alkoxylation the solvent used in the first step is not required and can at least partially removed in step (c).

This results in a higher space-time-yield because the alkoxylation in step (d) is carried out without a conventional solvent (regardless remaining traces) and the added second polymer which can also be alkoxylated can remain in the composition which is useful in cleaning compositions.

Since the second polymer of formula (I) has only one hydroxy group which can be alkoxylated and the first polymer comprises at least one monomer unit having NH groups and optionally $NH_2$ groups the amount (in wt.-%) of the alkoxylated second polymer is decreased with increasing degree of alkoxylation.

The process for the alkoxylation of a first polymer according to the present invention comprises the step (a) of reacting the first polymer with alkylene oxide in a reaction mixture comprising a solvent until the average degree of alkoxylation of each NH group and each optional $NH_2$ group, calculated as two NH groups, is from 0.75 to 1.25, preferably from 0.8 to 1.0, especially from 0.85 to 0.95.

The first polymer comprises at least one monomer unit having NH groups and optionally $NH_2$ groups and has a molecular weight $M_w$ of at least 500 g/mol.

More preferred the molecular weight $M_w$ is in the range of 500 g/mol to 1 000 000 g/mol, even more preferred in the range of 500 g/mol to 10 000 g/mol.

Because of the presence of the at least one monomer unit having NH groups and optionally $NH_2$ the first polymer comprises a multitude of NH groups dependent on the frequency of the repeating motive of the first monomer unit.

Typical polymers are polyalkylene imines, polyvinyl amines, polyether amines and amino group containing poly amides.

Preferably the first polymer is a polyethylene imine or amino group containing polyimide.

In step (a) more or less all NH groups are alkoxylated with a first hydroxyalkyl group. Since a primary amine group can react with two alkylene oxides this group is considered as two NH groups. However, since the alkoxylation is a statistic process the first alkoxylation step (a) will result in an average degree of alkoxylation from 0.75 to 1.25 or a preferred degree as mentioned above.

For this step the presence of a solvent is not critical. Thus, the reaction mixture comprises a solvent. For this reaction step (a) conventional solvent can be used. It is preferred that the solvent comprises water. Furthermore the solvent may be water.

The alkoxylation in the process of the present invention is conducted using an alkylene oxide. The alkylene oxide is preferably an alkylene oxide wherein the alkylene group has 2 to 5 carbon atoms. Examples are ethylene oxide and propylene oxide. Preferably the alkylene oxide is ethylene oxide.

After completion of the first alkoxylation step (a) the second polymer of formula (I)

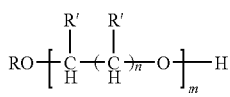

is added in step (b). In formula (I) the variables have the following meaning.

R is a linear or branched alkyl group having from 1 to 20 carbon atoms, each R' is independently a linear or branched alkyl group having from 1 to 20 carbon atoms or hydrogen, each n is independently from 1 to 5 and m from 5 to 40.

Within the meaning of the present invention the term polymer does also encompass a polymer mixture including a polymer as defined in more detail, wherein this polymer is preferably the main component of the mixture, preferably in an amount of at least 50 wt.-%, more preferred of at least 75 wt.-% based on the total weight of the mixture.

Preferably, R is in formula (I) a linear or branched alkyl group having 1 to 10 carbon atoms. More preferred R is an alkyl group having 1 to 4 carbon atoms. Even more preferred R is methyl.

Preferably each R' is independently methyl or hydrogen.

Preferably each n is the same and more preferred n is 1.

The definition of R' and n results in a monomer unit having a repeating motive wherein each unit is identical which is preferred or where there are two or more different monomer units. In case there are more monomer units it is preferred, that only two different monomer units are present, wherein the different monomer units can be distributed statistically or block wise.

Preferably m in formula (I) is from 5 to 30.

Preferably, the molecular weight of the second polymer of formula (I) $M_w$ is from 300 to 3000 g/mol.

After having added the second polymer of formula (I) the solvent can be removed at least partially in step (c).

The removal can be conducted by methods known in the art including distillation under vacuum and/or heat.

Stripping gases may also be used to remove the solvent. In some cases, adsorbing materials like molecular sieves or zeolites can be used.

It is preferred that the solvent is removed completely. However it may be acceptable to remove the solvent in part, preferably in that remaining content of the solvent is in the ppm range (lower than 1000 ppm).

In step (d) of the process of the present invention the resulting reaction mixture of step (c) is further reacted with alkylene oxide at a given temperature until the average degree of alkoxylation of each NH group and each optional $NH_2$ group, calculated as two NH groups, of the first polymer is from 2 to 40.

More preferred the average degree of alkoxylation is from 2 to 20.

The given reaction temperature in step (d) is preferably in the range of from 55° C. to 160° C.

Preferably the temperature is in the range from 80 to 120° C.

The alkoxylation in step (d) is preferably conducted in the presence of a base catalyst, which is in general known in the art and may be sodium hydroxide or potassium hydroxide.

The base catalyst is added before the further reacting in step (d). The catalyst may be added after step (c) or between step (b) and (c) or between step (a) and step (b). It is also possible to start with the at least partial removing in step (c), to add the catalyst and to complete the at least partial removing of the solvent so that the addition of the catalyst is conducted during step (c).

Another object of the present invention is a polymer composition obtainable from the process of the present invention comprising the alkoxylation products of the first and the second polymer.

This polymer composition can be used in cleaning compositions without separating the alkoxylation products.

It is preferred that the alkoxylation product of the second polymer is from 1 to 10% by weight based on the amount of the alkoxylation product of the first polymer.

EXAMPLES

Example 1

PEI 5000-10 EO/NH-7 PO/NH 1012.7 g Lupasol G100® of BASF AG, Ludwigshafen (Germany), which is an aqueous solution with 50 wt % of polyethylene imine with an average molecular weight of 5000 g/mol (PEI 5000), are flushed in an 2 liter autoclave at 80° C. with nitrogen up to 5 bar.

The temperature is raised to 120° C. and 466.3 g ethylene oxide is added within 310 minutes. The reaction mixture is stirred for 2 hours. The resulting product is cooled down, flushed with nitrogen and degassed resulting in a yellow viscose liquid (1472 g).

168.7 g of that liquid is combined with 14.88 g of a KOH solution (40 wt %) and 17.85 g of Pluriol A 350 E® of BASF AG, Ludwigshafen (Germany), which is the monomethyl ether of polyethylene glycol with an average molecular weight of 350 g/mol. The resulting mixture is flushed with nitrogen and subjected to vacuum increasing the temperature from 70° C. to 120° C. at 20 mbar for 3 hours to remove the water. After that 586 g ethylene oxide are added at 145° C. and reacted for 60 minutes. Subsequently 576 g propylene oxide is added at 145° C. and reacted for 60 minutes. The polymer composition is cooled down to 80° C. and flushed with nitrogen resulting in 1260 g of the product.

Example 2

Dynamic Viscosities [mPas] are Measured Using the Apparatus HAAKE Rheostress RS 150, Method Conus-Plate

| polymer | 100° C. | 120° C. | 140° C. |
|---|---|---|---|
| PEI 5000 + 1 EO/NH | 28000 | 8400 | ca. 6000 |
| PEI 5000 + 1 EO/NH + 15 wt.-% Pluriol A 350 E | 3800 | 1300 | 620 |

Example 3

Polymer from Diethylenetriamine+Adipic Acid (36:35)+30 EO/NH 1379.2 g polymer obtained by condensing diethylenetriamine and adipic acid (molar ratio 36:35) in form of an aqueous solution (73%) is introduced into an autoclave at 70° C. and flushed with nitrogen up to 5 bar. The temperature is raised to 90° C. and 210.6 g ethylene oxide is added in portions during 3.5 h. To complete the reaction, the mixture is stirred for further 3 h. A yellow viscous liquid is obtained (1565 g, 76.7% in water), consisting of a polymer from diethylenetriamine and adipic acid with 0.9 ethylene oxide per NH bond. The iodine color number is 1.4 (10% in water).

The obtained polymer (179.2 g) is introduced into an autoclave and 9.29 g potassium hydroxide (50% solution in water) and 27.5 g Pluriol A 1000 E of BASF AG, Ludwigshafen (Germany), which is the monomethylether of polyethylene glycol with an average molecular weight of 1000 g/mol. The resulting mixture is flushed with nitrogen and subjected to vacuum increasing the temperature to 90° C. at 20 mbar for 2 hours to remove the water. 792 g ethylene oxide are added at 90° C. The mixture is allowed to post-react for 3 hours. The polymer composition is cooled to 80° C. and flushed with nitrogen. A brown solid is obtained (950 g), consisting of a polymer from diethylenetriamine and adipic acid with 30 mol ethylene oxide per mol NH bond.

Example 4

Dynamic Viscosities [mPas] are Measured Using the Apparatus HAAKE Rheostress RS 150, Method Conus-Plate

| polymer | 100° C. | 130° C. |
|---|---|---|
| DETA + ADS (36:35) + 0.9 EO/NH | 105 000 | 15 000 |
| DETA + ADS (36:35) + 0.9 EO/NH + 20 wt.-% Pluriol A 1000E | 47 000 | ca. 4000 |

Example 5

Polymer from Diethylenetriamine+Adipic Acid (5:4)+5.3 EO/NH 1373.5 g polymer obtained by condensing diethylenetriamine and adipic acid (molar ratio 5:4) in form of an aqueous solution (69%) is introduced into an autoclave at 70° C. and flushed with nitrogen up to 5 bar. The temperature is raised to 90° C. and 303 g ethylene oxide is added in portions during 3 h. To complete the reaction, the mixture is stirred for further 1 h. A yellow viscous liquid is obtained (1660 g, 67% in water), consisting of a polymer from diethylenetriamine and adipic acid with 0.9 ethylene oxide per NH bond.

The obtained polymer (375 g) is introduced into an autoclave and 26.5 g potassium hydroxide (40% solution in water) and 76.8 g Pluriol A 1000 E of BASF AG, Ludwigshafen (Germany), which is the monomethylether of polyethylene glycol with an average molecular weight of 1000 g/mol. The resulting mixture is flushed with nitrogen and subjected to vacuum increasing the temperature to 90° C. at 20 mbar for 2 hours to remove the water. 344.8 g ethylene oxide are added at 90° C. in portions during 2 hours. The mixture is allowed to post-react for 3 h. The polymer composition is cooled to 80° C. and flushed with nitrogen. A light brown viscous liquid is obtained (690 g), consisting of a polymer from diethylenetriamine and adipic acid with 5.3 mol ethylene oxide per mol NH bond. The iodine color number is 1.0 (10% in water).

The invention claimed is:

1. A process for alkoxylating polymers comprising:
(a) reacting a first polymer comprising at least one monomer unit having NH groups and optionally $NH_2$ groups, wherein the first polymer has a molecular weight $M_w$ of at least 500 g/mol, with alkylene oxide in a reaction mixture comprising a solvent until the average degree of alkoxylation of each NH group and each optional $NH_2$ group, calculated as two NH groups, is from 0.75 to 1.25, to obtain a first reaction mixture;
(b) adding a second polymer of formula

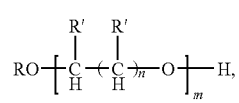

wherein R is a linear or branched alkyl group having from 1 to 20 carbon atoms, each R' is independently a linear or branched alkyl group having from 1 to 20 carbon atoms or hydrogen, each n is independently from 1 to 5 and m is from 5 to 40, to the first reaction mixture to obtain a second reaction mixture;
(c) at least partially removing the solvent from the second reaction mixture to obtain a third reaction mixture; and
(d) further reacting the third reaction mixture with alkylene oxide at a given temperature until the average degree of alkoxylation of each NH group and each optional $NH_2$ group, calculated as two NH groups, of the first polymer is from 2 to 40.

2. The process of claim 1, wherein the first polymer is at least one polymer selected from the group consisting of a polyalkylene imine, a polyvinyl amine, a polyether amine, or an amino group containing poly amide.

3. The process of claim 2, wherein the first polymer is polyethylene imine.

4. The process of claim 1, wherein the alkylene oxide is ethylene oxide.

5. The process of claim 1, wherein the solvent comprises water.

6. The process of claim 1, wherein in formula (I) R is a linear or branched alkyl group having 1 to 10 carbon atoms.

7. The process of claim 1, wherein in formula (I) each R' is independently methyl or hydrogen.

8. The process of claim 1, wherein in formula (I) n is 1.

9. The process of claim 1, wherein in formula (I) m is from 5 to 30.

10. The process of claim 1, wherein in said partially removing (c) the solvent is at least partially removed by distillation.

11. The process of claim 1, wherein the average degree of alkoxylation of said first polymer in the further reacting (d) is from 2 to 20.

12. The process of claim 1, wherein the further reacting (d) is conducted at a temperature in the range of from 55° C. to 160° C.

13. The process of claim 1, wherein the further reacting (d) is conducted in the presence of a base catalyst.

14. The process of claim 1, wherein said first polymer has a molecular weight $M_w$ of 500 to 10,000 g/mol.

15. The process of claim 1, wherein said second polymer has a molecular weight $M_w$ of 300 to 3,000 g/mol.

16. The process of claim 1, wherein said third reaction mixture has a solvent content of less than 1,000 ppm.

17. The process of claim 1, wherein the further reacting (d) is conducted at a temperature in the range of from 80° C. to 120° C.

18. The process of claim 13, wherein said base catalyst is at least one catalyst selected from the group consisting of sodium hydroxide and potassium hydroxide.

19. The process of claim 1, wherein an alkoxylation product of said second polymer is from 1 to 10% by weight based on an amount of alkoxylation product of said first polymer.

* * * * *